2,696,505
PRODUCTION OF OXIMES

Harry Welz, Krefeld, Germany, assignor to Farbenfabriken Bayer Aktiengesellschaft, Leverkusen, Germany, a corporation of Germany No Drawing. Application December 6, 1951, Serial No. 260,320

Claims priority, application Germany November 30, 1949

11 Claims. (Cl. 260—566)

This is a continuation-in-part application to my copending application Serial No. 200,103, filed November 20, 1950, now abandoned.

The present invention relates to the production of oximes by reduction of salts of nitro alkanes.

It is known to reduce the alkali metal salts of primary or secondary nitro compounds of the aliphatic or cycloaliphatic series to the corresponding oximes, by means of stannous chloride in hydrochloric acid solution. It is a disadvantage of that method that the separation of the tin compound formed during the reduction of the nitro compounds is very inconvenient. Hence, it has already been suggested to reduce nitrocyclohexane by means of hydrogen under pressure. However that method gives unsatisfactory yields.

I have now found that the alkali metal or alkaline earth metal salts of nitro alkanes, the nitro group of which is connected with a carbon atom carrying at least one hydrogen atom, i. e. primary or secondary nitro alkanes of this kind, can be reduced to the corresponding oximes by means of hydrogen sulphide in an acid medium, in a technically simple manner and with good yields. The above mentioned alkali metal or alkaline earth metal salts of the said nitro alkanes, e. g. the sodium, potassium, lithium, calcium, barium or strontium salts, can be easily obtained, in a manner known per se, by reacting the nitro alkanes with the corresponding alkali metal or alkaline earth metal hydroxides.

As nitro alkanes, the nitro group of which is connected with a carbon atom carrying at least one hydrogen atom, can be used for example aliphatic mononitro alkanes such as nitroethane, 2-chloro-1-nitroethane, 1-nitropropane, 2-chloro-1-nitropropane, 2-nitropropane, 1-chloro-2-nitropropane, 1-nitrobutane, 2-nitrobutane, 1-nitropentane, 2-nitropentane, 2-nitrohexane, 1-nitrononane, 1-nitro-2,7-dimethyloctane, 1-nitroundecane and the mononitro alkanes obtainable by nitration of the alkanes of the Fischer-Tropsch synthesis, mononitro cyclo alkanes such as nitrocyclohexane, 2-nitro-1-methylcyclohexane, 3-nitro-1-methylcyclohexane, 1-nitrodecahydronaphthalene and 2-nitrodecahydronaphthalene, polynitro alkanes such as 1,1-dinitroethane, 1,2-dinitroethane, 1,1-dinitropropane, 1,2-dinitropropane, 1,1-dinitrobutane, 2,3-dinitrobutane, 1,4-dinitrobutane, 1,1-dinitropentane, 1,5-dinitropentane, 2,3-dinitro-2-methylbutane and the polynitro alkanes obtainable by nitration of the alkanes of the Fischer-Tropsch synthesis, finally cycloaliphatic polynitro alkanes such as 1,2-dinitrocyclohexane, 1,3-dinitrocyclohexane and 1,4-dinitrocyclohexane.

Generally the reaction may be performed in the temperature range above the freezing point and below the decomposition point of the reaction components the best results being obtained in the temperature range of about 0° to about 50° C. and particularly of about 10° to about 30° C.

It may be mentioned that the proportions and the reactions times are not essential except as they affect the yield; if less hydrogen sulfide is used than calculated, less oxime is produced and if an excess of hydrogen sulfide is used, the excess is not consumed.

The oximes can be separated in a simple manner by extraction with a solvent from the sulphur which is formed from the hydrogen sulfide during the reduction. As solvents can be used, for example, hydrocarbons such as hexane, heptane, cyclohexane, benzine and toluene, or alcohols such as methyl and ethyl alcohol.

The yield of oxime is largely dependent on the hydrogen ion concentration of the reaction mixture. The best yields are obtained at a pH of about 2 to about 4, and particularly at a pH of about 3.

The reduction can be carried out both in aqueous solution and in organic solvents or suspending media such as hexane, heptane, cyclohexane, benzene, methyl alcohol or ethyl alcohol.

The invention is illustrated by the following examples:

Example 1

A solution of 167 grams of nitroethane in 1000 grams of an aqueous 10% solution of caustic soda is introduced into dilute sulphuric acid of pH=3 while stirring vigorously, hydrogen sulfide being passed into the solution at the same time. During the reaction which takes about three hours, the hydrogen ion concentration (pH=3) is kept constant by adding sulphuric acid in drops. The reaction mixture is neutralised with caustic soda solution and then extracted with benzene. After distillation of the benzene, a residue of 113.5 grams of acetaldehyde oxime is obtained (=86% of the theoretical amount).

Example 2

A solution of 287 grams of nitrocyclohexane in 1000 grams of an aqueous 10% solution of caustic soda is mixed with a saturated aqueous solution of 780 grams of sodium sulfide ($Na_2S + 9H_2O$). The mixture is introduced, while vigorously stirring into dilute sulphuric acid of pH=3. By adding sulphuric acid at the same time, care is taken that the hydrogen ion concentration (pH=3) remains constant. The reaction temperature should not exceed 30° C. After about one hour and a half to two hours, the reaction mixture is neutralised with a solution of caustic soda in methyl alcohol, the major part of the oxime being precipitated. The oxime, together with the sulphur formed at the same time is filtered off and separated from the sulphur by extraction with methanol. Part of the oxime, and cyclohexanone and cyclohexanol formed as by-products, remain still dissolved in the aqueous solution. These compounds can be extracted from the aqueous solution by means of benzene. The separation of cyclohexanone and cyclohexanol from the oxime is effected by distillation in vacuo. The aqueous solution also contains a small amount of cyclohexylamine sulphate.

The total yield is 197 grams of cyclohexanone oxime (=78.5% of the theoretical amount); in addition, there are also obtained as by-products 25 grams of cyclohexanone, 15 grams cyclohexanol and 10 grams of cyclohexylamine.

Example 3

A solution of 287 grams of nitrocyclohexane in 1000 grams of a 10% solution of caustic soda in methyl alcohol is introduced, while stirring strongly into methyl alcoholic sulphuric acid of pH=3, hydrogensulphide being passed into the solution at the same time. By adding methyl alcoholic sulphuric acid, care is taken to keep the hydrogen ion concentration (pH=3) constant. The reaction is finished after about 2 hours. For working up, the reaction mixture is neutralised with a solution of caustic soda in methyl alcohol, then the precipitated sulphur is filtered off, and the oxime isolated from the filtrate by distilling off the methyl alcohol. Yield: 192 grams of cyclohexanone oxime (=77% of the theoretical amount); in addition, there are obtained as byproducts 25 grams of cyclohexanone, 22 grams of cyclohexanol, and 10 grams of cyclohexylamine.

Example 4

A solution of 148 grams of dinitrobutane(2,3) in 1260 grams of a 10% solution of caustic potash is mixed with a saturated aqueous solution of 700 grams of sodium sulfide ($Na_2S + 9H_2O$). This mixture is introduced while stirring into aqueous sulphuric acid of pH=3. By adding sulphuric acid care is taken to keep the hydrogen ion concentration (pH=3) constant. The reaction temerature should not exceed 20°. After three hours the reaction mixture is neutralised with caustic potash lye, the butane dioxime (2,3) being precipitated. The oxime together with the sulphur obtained at the same time is filtered off and separated by extraction with methanol. The yield is 82 grams of butanedioxime(2,3)=71% of the theoretical amount.

I claim:
1. A process for the production of oximes, which comprises introducing hydrogen sulfide into an acid solution of a salt selected from the group consisting of the alkali metal and alkaline earth metal salts of mono- and dinitro alkanes having from 2 to 11 carbon atoms and mono- and dinitro mono- and dicyclo alkanes, whose nitro groups are connected to carbon atoms carrying at least one hydrogen atom.
2. A process for the production of oximes, which comprises introducing hydrogen sulfide into an acid solution of an alkali metal salt of a mononitro alkane having from 2 to 11 carbon atoms whose nitro group is connected to a carbon atom carrying at least one hydrogen atom.
3. A process for the production of oximes, which comprises introducing hydrogen sulfide into an acid solution of an alkali metal salt of a primary mononitro alkane having from 2 to 11 carbon atoms at a pH of up to about 4.
4. A process for the production of acetaldehyde oxime which comprises introducing hydrogen sulfide into a solution of the sodium salt of mononitro ethane in dilute sulphuric acid of pH=3.
5. A process for the production of oximes, which comprises introducing hydrogen sulfide into an acid solution of an alkali metal salt of a secondary mononitro alkane having from 2 to 11 carbon atoms at a pH of up to about 4.
6. A process for the production of oximes, which comprises introducing hydrogen sulfide into an acid solution of an alkali metal salt of a secondary mononitro cyclo alkane of the group consisting of mono- and dicyclo alkanes at a pH of up to about 4.
7. A process for the production of cyclohexanone oxime which comprises introducing hydrogen sulfide into a solution of the sodium salt of mononitro cyclohexane in dilute sulphuric acid of pH=3.
8. A process for the production of oximes, which comprises introducing hydrogen sulfide into an acid solution of an alkaline earth metal salt of a mononitro alkane having from 2 to 11 carbon atoms whose nitro group is connected to a carbon atom carrying at least one hydrogen atom.
9. A process for the production of oximes, which comprises introducing hydrogen sulfide into an acid solution of an alkaline earth metal salts of a primary mononitro alkane having from 2 to 11 carbon atoms at a pH of up to about 4.
10. A process for the production of oximes, which comprises introducing hydrogen sulfide into an acid solution of an alkaline earth metal salt of a secondary mononitro cyclo alkane of the group consisting of mono- and dicyclo alkanes at a pH of up to about 4.
11. A process for the production of cyclohexanone oxime which comprises introducing hydrogen sulfide into a solution of the calcium salt of mononitro cyclohexane in dilute sulphuric acid of pH=3.

References Cited in the file of this patent

UNITED STATES PATENTS

| Number | Name | Date |
|---|---|---|
| 2,233,823 | Susie | Mar. 4, 1941 |
| 2,423,180 | Doumani | July 1, 1947 |
| 2,464,194 | Zimmerman | Mar. 8, 1949 |

FOREIGN PATENTS

| Number | Country | Date |
|---|---|---|
| 499,518 | Belgium | Dec. 15, 1950 |
| 825,544 | Germany | Dec. 20, 1951 |

OTHER REFERENCES

Latimer, "Reference Book of Inorganic Chemistry," The Macmillan Co., New York, N. Y., 1940, pp. 240-2.